(12) United States Patent
Deckman

(10) Patent No.: US 8,858,683 B2
(45) Date of Patent: Oct. 14, 2014

(54) SWING ADSORPTION PROCESSES UTILIZING CONTROLLED ADSORPTION FRONTS

(75) Inventor: Harry W. Deckman, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 158 days.

(21) Appl. No.: 13/406,083

(22) Filed: Feb. 27, 2012

(65) Prior Publication Data

US 2012/0222551 A1    Sep. 6, 2012

Related U.S. Application Data

(60) Provisional application No. 61/447,835, filed on Mar. 1, 2011, provisional application No. 61/447,806, filed (Continued)

(51) Int. Cl.
*B01D 53/047* (2006.01)
*C10L 3/10* (2006.01)

(Continued)

(52) U.S. Cl.
CPC .......... *B01D 53/047* (2013.01); *B01D 2253/34* (2013.01); *C01B 17/167* (2013.01); *B01D 2252/20431* (2013.01); *B01D 2252/20489* (2013.01); *B01J 20/3483* (2013.01); *C01B 17/0408* (2013.01); *B01J 20/28057* (2013.01); *B01J 2220/42* (2013.01); *B01D 2253/306* (2013.01); *B01D 2253/25* (2013.01); *B01J 20/3416* (2013.01); *B01D 2253/1085* (2013.01); *B01J 20/28078* (2013.01); *B01D 2259/402* (2013.01); *B01D 2253/116* (2013.01); *B01D 2259/40052* (2013.01); *B01J 20/28042* (2013.01); *B01D 2253/102* (2013.01); *B01J 20/18* (2013.01); *B01J 20/20* (2013.01);

(Continued)

(58) Field of Classification Search
USPC .............. 95/96, 136, 139; 585/820, 823, 826; 423/230; 96/131
See application file for complete search history.

(56) References Cited

U.S. PATENT DOCUMENTS 2,989,383 A    6/1961    Miller
3,594,983 A    7/1971    Yearout (Continued)

FOREIGN PATENT DOCUMENTS

CN    101475430 A    7/2009
EP    1 421 986 B1    5/2004

(Continued)

OTHER PUBLICATIONS

Rezaei F. et al.: "Structured absorbents in gas separation processes". Separation and Purification Technology, Elsevier Science, Amsterdam, NL, vol. 70, No. 3, Jan. 12, 2012, pp. 243-256, ISSN: 1383-5866.

(Continued)

*Primary Examiner* — Frank Lawrence
(74) *Attorney, Agent, or Firm* — David M. Weisberg

(57) ABSTRACT

A process for reducing the loss of valuable products by improving the overall recovery of a contaminant gas component in swing adsorption processes. The present invention utilizes at least two adsorption beds, in series, with separately controlled cycles to control the adsorption front and optionally to maximize the overall capacity of a swing adsorption process and to improve overall recovery a contaminant gas component from a feed gas mixture.

23 Claims, 6 Drawing Sheets

Related U.S. Application Data on Mar. 1, 2011, provisional application No. 61/447,812, filed on Mar. 1, 2011, provisional application No. 61/447,824, filed on Mar. 1, 2011, provisional application No. 61/447,848, filed on Mar. 1, 2011, provisional application No. 61/477,869, filed on Apr. 21, 2011, provisional application No. 61/477,877, filed on Apr. 21, 2011.

(51) Int. Cl.

| | | |
|---|---|---|
| *C01B 17/16* | (2006.01) | |
| *B01J 20/34* | (2006.01) | |
| *C01B 17/04* | (2006.01) | |
| *B01J 20/28* | (2006.01) | |
| *B01J 20/18* | (2006.01) | |
| *B01J 20/20* | (2006.01) | |
| *B01J 20/22* | (2006.01) | |
| *B01D 53/04* | (2006.01) | |
| *B01D 53/52* | (2006.01) | |

(52) U.S. Cl.
CPC .............. *C10L 3/103* (2013.01); *B01J 2220/56* (2013.01); *B01D 2252/20436* (2013.01); *B01D 2256/245* (2013.01); *B01D 53/0473* (2013.01); *B01J 20/226* (2013.01); *B01D 2253/204* (2013.01); *B01D 2253/311* (2013.01); *B01J 20/186* (2013.01); *B01J 20/3491* (2013.01); *B01D 53/0438* (2013.01); *B01D 2257/304* (2013.01); *B01D 2257/504* (2013.01); *Y02C 10/08* (2013.01); *C10L 3/105* (2013.01); *B01D 2253/106* (2013.01); *B01J 2220/46* (2013.01); *B01D 53/0462* (2013.01); *B01D 2256/24* (2013.01); *C10L 3/104* (2013.01); *B01D 2257/102* (2013.01); *B01D 2253/108* (2013.01); *B01J 20/3408* (2013.01); *B01D 2259/41* (2013.01); *B01D 53/526* (2013.01); *B01D 2253/304* (2013.01); *B01D 2259/40022* (2013.01); *B01D 2257/7022* (2013.01)
USPC ..................................... 95/96; 95/136; 95/139

(56) References Cited

U.S. PATENT DOCUMENTS

| | | |
|---|---|---|
| 4,094,652 A | 6/1978 | Lowther |
| 4,269,611 A | 5/1981 | Anderberg |
| 4,312,641 A | 1/1982 | Verrando et al. |
| 4,329,158 A | 5/1982 | Sircar |
| 4,350,501 A | 9/1982 | Bannon |
| 4,405,343 A | 9/1983 | Othmer |
| 4,424,837 A | 1/1984 | Farrell |
| 4,433,707 A | 2/1984 | Farnham |
| 4,640,694 A * | 2/1987 | Leitgeb et al. ................... 95/100 |
| 4,702,903 A | 10/1987 | Keefer |
| 4,729,982 A | 3/1988 | Thistlethwaite et al. |
| 4,753,919 A | 6/1988 | Whittenberger |
| 4,772,579 A | 9/1988 | Thistlethwaite et al. |
| 4,801,308 A | 1/1989 | Keefer |
| 4,914,218 A | 4/1990 | Kumar et al. |
| 4,968,329 A | 11/1990 | Keefer |
| 5,057,296 A | 10/1991 | Beck |
| 5,074,892 A | 12/1991 | Leavitt |
| 5,082,473 A | 1/1992 | Keefer |
| 5,089,034 A | 2/1992 | Markovs et al. |
| 5,098,684 A | 3/1992 | Kresge et al. |
| 5,102,643 A | 4/1992 | Kresge et al. |
| 5,108,725 A | 4/1992 | Beck et al. |
| 5,141,725 A | 8/1992 | Ramprasad et al. |
| 5,171,333 A | 12/1992 | Maurer |
| 5,225,174 A | 7/1993 | Friesen et al. |
| 5,256,172 A | 10/1993 | Keefer |
| 5,271,762 A | 12/1993 | Schoofs et al. |
| 5,298,054 A | 3/1994 | Malik |
| 5,516,745 A | 5/1996 | Friesen et al. |
| 5,626,033 A | 5/1997 | Tamhankar et al. |
| 5,669,962 A | 9/1997 | Dunne |
| 5,792,897 A * | 8/1998 | Rosser et al. ................. 585/738 |
| 5,846,295 A | 12/1998 | Kalbassi et al. |
| 5,958,368 A | 9/1999 | Ryoo et al. |
| 6,051,050 A | 4/2000 | Keefer et al. |
| 6,063,161 A | 5/2000 | Keefer et al. |
| 6,077,457 A | 6/2000 | Friesen et al. |
| 6,080,226 A | 6/2000 | Dolan et al. |
| 6,136,222 A | 10/2000 | Friesen et al. |
| 6,197,092 B1 | 3/2001 | Butwell et al. |
| 6,293,998 B1 | 9/2001 | Dolan et al. |
| 6,315,817 B1 | 11/2001 | Butwell et al. |
| 6,336,957 B1 | 1/2002 | Tsymerman |
| 6,406,523 B1 | 6/2002 | Connor et al. |
| 6,475,265 B1 | 11/2002 | Baksh et al. |
| 6,514,318 B2 | 2/2003 | Keefer |
| 6,607,584 B2 | 8/2003 | Moreau et al. |
| 6,629,525 B2 | 10/2003 | Hill et al. |
| 6,651,658 B1 | 11/2003 | Hill et al. |
| 6,652,627 B1 | 11/2003 | Tonkovich et al. |
| 6,691,702 B2 | 2/2004 | Appel et al. |
| 6,905,592 B2 * | 6/2005 | Bence et al. ............... 208/208 R |
| 7,049,259 B1 | 5/2006 | Deckman et al. |
| 7,231,784 B2 | 6/2007 | Howard et al. |
| 7,270,792 B2 | 9/2007 | Deckman et al. |
| 7,491,250 B2 | 2/2009 | Hershkowitz et al. |
| 7,507,274 B2 | 3/2009 | Tonkovich et al. |
| 7,524,358 B2 | 4/2009 | Saxena et al. |
| 7,527,670 B2 | 5/2009 | Ackley et al. |
| 7,799,730 B2 | 9/2010 | Ringer et al. |
| 7,803,215 B2 | 9/2010 | Russell et al. |
| 7,938,886 B2 | 5/2011 | Hershkowitz et al. |
| 7,959,720 B2 | 6/2011 | Deckman et al. |
| 2003/0015093 A1 | 1/2003 | Wegeng et al. |
| 2003/0116016 A1 | 6/2003 | Monzyk et al. |
| 2005/0045030 A1 | 3/2005 | Tonkovich et al. |
| 2006/0075777 A1 | 4/2006 | Howard et al. |
| 2006/0102519 A1 | 5/2006 | Tonkovich et al. |
| 2006/0162556 A1 | 7/2006 | Ackley et al. |
| 2006/0165574 A1 | 7/2006 | Sayari |
| 2006/0210454 A1 | 9/2006 | Saxena et al. |
| 2006/0249020 A1 | 11/2006 | Tonkovich et al. |
| 2007/0085227 A1 | 4/2007 | Tonkovich et al. |
| 2007/0240449 A1 | 10/2007 | Howard et al. |
| 2007/0246106 A1 | 10/2007 | Tonkovich et al. |
| 2008/0028286 A1 | 1/2008 | Chick |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance et al. |
| 2008/0282892 A1 | 11/2008 | Deckman et al. |
| 2008/0314245 A1 | 12/2008 | Hershkowitz et al. |
| 2009/0151562 A1 | 6/2009 | Russell et al. |
| 2009/0211441 A1 | 8/2009 | Reyes et al. |
| 2009/0217691 A1 | 9/2009 | Schmidt et al. |
| 2009/0294348 A1 | 12/2009 | Krogue et al. |
| 2009/0308248 A1 | 12/2009 | Siskin et al. |
| 2009/0326279 A1 | 12/2009 | Tonkovich et al. |
| 2010/0251887 A1 | 10/2010 | Jain |
| 2010/0263534 A1 | 10/2010 | Chuang |
| 2010/0326272 A1 | 12/2010 | Asaro et al. |
| 2012/0222552 A1 | 9/2012 | Ravikovitch et al. |
| 2012/0222553 A1 | 9/2012 | Kamakoti et al. |
| 2012/0312163 A1 | 12/2012 | Leta et al. |

FOREIGN PATENT DOCUMENTS

| | | |
|---|---|---|
| EP | 1080771 B1 | 10/2007 |
| JP | 2000317244 A | 11/2000 |
| JP | 2002326810 A | 11/2002 |
| WO | 92/05859 | 4/1992 |
| WO | 96/14917 | 5/1996 |
| WO | 02/087730 A2 | 11/2002 |
| WO | 2005/061100 A1 | 7/2005 |
| WO | 2008/000380 A1 | 1/2008 |

(56) References Cited

FOREIGN PATENT DOCUMENTS

| | | | |
|---|---|---|---|
| WO | 2008/143826 | A1 | 11/2008 |
| WO | 2008/143966 | A1 | 11/2008 |
| WO | 2009/105251 | A1 | 8/2009 |
| WO | 2010/064121 | A8 | 6/2010 |
| WO | 2010/096916 | A1 | 9/2010 |
| WO | 2010/130787 | A1 | 11/2010 |

OTHER PUBLICATIONS

Ruthven, D. M., Thaeron, C. "Performance of a parallel passage adsorbent contactor", Separation and Purification Technology, vol. 12 (1997), pp. 43-60.

Suib, Steven L, O'Young, Chi-Lin "Synthesis of Octahedral Molecular Sieves and Layered Materials", Marcel Dekker, Inc., vol. 69 (1997), pp. 215-231.

Zhao, Dongyuan, Feng, Jianglin, Huo, Qishing, Melosh, Nicholas, Fredrickson, Glenn H., Chmelka, Bradley F., Stucky, Galen D. "Triblock Copolymer Syntheses of Mesoporous Silica with Periodic 50 to 300 Angstrom Pores", Science, vol. 279 (Jan. 23, 1998), pp. 548-552.

Zamani, Cyrus, Illa, Xavi, Abdollahzadeh-Ghom, Sara, Morante, J. R., Rodriguez, Albert Romano "Mesoporous Silica: A Suitable Adsorbent for Amines", Nanoscale Res Lett, vol. 4 (2009), pp. 1303-1308.

Santos, Monica S., Grande, Carlos A., Rodrigues, Alirio E. "New cycle configuration to enhance performance of kinetic PSA processes", Chemical Engineering Science 66 (2011) pp. 1590-1599.

\* cited by examiner

SWING ADSORPTION PROCESSES UTILIZING CONTROLLED ADSORPTION FRONTS

CROSS-REFERENCE TO RELATED APPLICATIONS

This application claims priority to U.S. Provisional Ser. No. 61/447,835 filed Mar. 1, 2011, herein incorporated by reference in its entirety. This application further claims priority to related U.S. Ser. Nos. 61/447,806, 61/447,812, 61/447,824, 61/447,848, 61/447,869, and 61/447,877, each filed Mar. 1, 2011, and each being incorporated by reference herein in its entirety, as well as the six U.S. non-provisional applications filed on even date herewith and claiming priority thereto, each of which being additionally incorporated by reference herein in their entirety.

This application is further related to co-pending U.S. Ser. Nos. 61/448,117, 61/448,120, 61/448,121, 61/448,123, and 61/448,125, each filed Mar. 1, 2011, 61/594,824 filed Feb. 3, 2012, and the application entitled "Apparatus and Systems having a Rotary Valve Assembly and Swing Adsorption Processes Related Thereto" by Robert F. Tammera et al. filed on even date herewith, each being incorporated by reference herein in its entirety, as well as any U.S. non-provisional applications claiming priority thereto and presumably filed on even date herewith, each of which being additionally incorporated by reference herein in their entirety.

FIELD OF THE INVENTION

This invention relates to a method for reducing the loss of valuable products by improving the overall recovery of a targeted product gas component in swing adsorption processes. This invention relates to swing adsorption processes, including improved processes for temperature swing adsorption (TSA) processes, pressure swing adsorption (PSA) processes, and related separations processes.

BACKGROUND OF THE INVENTION

Swing adsorption processes are well known in the art for the separation of one or more gaseous components from a gas mixture. The term "swing adsorption process" includes all swing adsorption process including temperature swing adsorption (TSA), pressure swing adsorption (PSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

The first step in any swing adsorption process cycle is an adsorption step. In the adsorption step a gaseous feed mixture is flowed through an adsorbent bed and one or more of the components of the gaseous feed mixture are adsorbed by the adsorbent. These adsorbed components are sometimes referred to as "strongly adsorbed" components". The non-adsorbed components are sometimes referred to as the "weakly adsorbed" components and pass through the adsorbent bed, without being adsorbed, to form a product stream. Depending on feed composition, there can be several strongly adsorbed component fronts passing through the bed, but there is always one that leads. The gas ahead of the leading front has a composition near that of the product. Behind the leading front the gas has a composition with a significant concentration of at least one of the strongly adsorbed components. In a conventional swing adsorption process, the adsorption step is stopped well before the leading front breaks-through the end of the adsorbent bed. The amount of feed that emerges from the contactor before this step is halted determines, in part, product recovery and purity. Typically, the adsorption step is stopped when the front advances to no more than about 0.75 to 0.85 of the length of the adsorption bed, thus preventing the front from breaking through the adsorption bed. This leaves a significant amount of product from the adsorption step at the end of the bed at the beginning of the regeneration cycle. Design of the regeneration cycles typically attempts to capture as much of the product as possible, but a certain amount inevitably flows into the strongly adsorbed component product streams. In some instances, as much as a third of what would have been the product remains in the bed when the adsorption cycle is stopped. Therefore, there is a need in the swing adsorption art for processes that are able to mitigate the amount of product trapped at the end of the adsorption bed and improve utilization of the full capacity of the adsorbent material utilized.

SUMMARY OF THE INVENTION

One aspect of the invention herein is a swing adsorption process for separating contaminant gas components from a feed gas mixture containing at least one contaminant gas component, which process comprises: a) conducting the feed gas mixture directly to a first adsorption bed in a swing adsorption process unit containing a plurality of adsorbent beds each having a fluid inlet end and fluid outlet end wherein the first adsorption bed has a first primary adsorption cycle defined by the period of time from the start of connecting the fluid input end of the first adsorption bed directly to said feed gas mixture to the end of connecting the fluid input end of the first adsorption bed directly to said feed gas mixture; b) retrieving a first product stream flow from the fluid outlet end of the first adsorption bed; c) fluidly connecting the fluid outlet end of the first adsorption bed with the fluid inlet end of a second adsorption bed in the swing adsorption process unit during a point in the first primary adsorption cycle so that at least a portion of the first product stream from the fluid outlet end of the first adsorption bed is passed to the fluid inlet end of the second adsorption bed at which time the second adsorption bed is in a first secondary adsorption cycle which first secondary adsorption cycle is defined by the period of time from the start of exposing the second adsorption bed to the first product stream from the fluid outlet end of the first adsorption bed to the end of exposing the second adsorption bed to the first product stream from the fluid outlet end of the first adsorption bed; d) retrieving a second product stream flow from the fluid outlet end of the second adsorption bed; e) fluidly disconnecting the fluid outlet end of the first adsorption bed from the fluid inlet end of a second adsorption bed; and f) conducting the feed gas mixture directly to the second adsorption bed wherein the second adsorption bed has a second primary adsorption cycle defined by the period of time from the start of connecting the fluid input end of the second adsorption bed directly to said feed gas mixture to the end of connecting the fluid input end of the second adsorption bed directly to said feed gas mixture, wherein the first product stream and the second product stream each have a lower mol % of the contaminant gas component than the feed gas mixture, and the beginnings and ends of the first primary adsorption cycle and the second primary adsorption cycle do not both coincide with each other.

In a preferred embodiment, the contactor can be a parallel channel contactor for use in gas separation adsorption process units, which contactors can be engineered structures containing a plurality of open flow channels, preferably oriented substantially parallel to each other as well as substantially parallel to the flow of feed gas, wherein the surface of the open flow channels can be composed of and/or can be lined with an adsorbent material selective for adsorption of at least one of the components of a gas mixture, and which open flow channels can have less than about 20 vol % of their open pore volume in pores greater than about 20 angstroms.

DETAILED DESCRIPTION OF THE EMBODIMENTS

All numerical values within the detailed description and the claims herein are modified by "about" or "approximately" the indicated value, and take into account experimental error and variations that would be expected by a person having ordinary skill in the art.

Non-limiting examples of swing adsorption processes for which the present invention can be applied include thermal swing adsorption (TSA), pressure swing adsorption (PSA), partial pressure swing adsorption (PPSA), rapid cycle pressure swing adsorption (RCPSA), rapid cycle thermal swing adsorption (RCTSA), rapid cycle partial pressure swing adsorption (RCPPSA), and combinations thereof (such as pressure/temperature swing adsorption, or PTSA). PSA can be a preferred swing adsorption process for the practice of the present invention.

Each of these swing adsorption processes can be comprised of a number of "steps" that include a number of adsorption and desorption stages that, in combination, can lead to a complete swing adsorption cycle that can be periodically repeated. Since multiple adsorbent beds are typically used, their appropriate time synchronization can lead to the continuous production of products. A complete swing adsorption cycle on a particular adsorbent bed can comprise all of the adsorption and desorption steps that are taken, beginning with the very first contacting of the feed gas mixture with a substantially adsorbate-free adsorbent and/or regenerated adsorbent bed and continuing through the last desorption stage that regenerates the adsorbent to its adsorbate-free or substantially adsorbate-free state and ready for another adsorption cycle. The desorption step can be accomplished by pressure swinging, thermally swinging, and/or purging the adsorbent bed. The name of the process type (i.e., TSA, PSA, PPSA) can be assigned by the regeneration method. The cycle includes any additional repressurizing and/or purging steps that may occur to bring the "cycle" back to the first contacting of the feed gas mixture with the adsorbate-free or substantially adsorbent-free adsorbent which has begun the "cycle". At this point, the next swing adsorption "cycle" can be started, and the cycle subsequently repeated. Conventional swing adsorption processes are discussed by D. M. Ruthven, *Principles of Adsorption and Adsorption Processes*, John Wiley, NY (1984), which is incorporated herein by reference.

It is possible to remove two or more contaminants simultaneously but, for convenience, the component or components to be removed by selective adsorption can be referred to in the singular and referred to as a contaminant, contaminant gas, contaminant gas component, adsorbed component, strongly adsorbed component, or the like. All such terms are used interchangeably herein, unless otherwise indicated herein.

Figure 4:
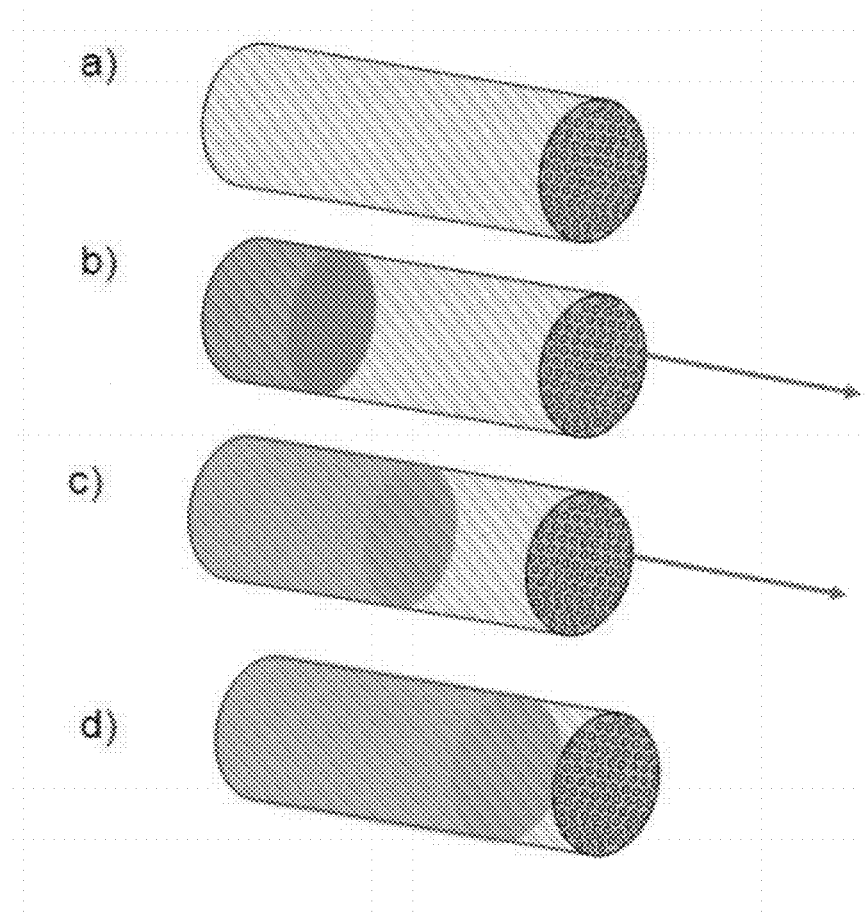
FIG. 4 hereof is a graphical representation of adsorption front management according to the prior art.

In prior art PSA processes, the gaseous mixture can be passed over a first adsorbent bed in a first vessel and a light component enriched product stream can emerge from the bed depleted in the contaminant component, which then remains adsorbed by the bed. After a predetermined time or, alternatively, prior to a break-through of the contaminant component is observed, the flow of the gaseous mixture can be switched to a second adsorbent bed for the purification to continue. FIG. 4 herein graphically illustrates a common operation of a PSA bed in the prior art. Here as shown in FIG. 4*a*), a desorbed adsorbent bed that has completed a cycle is ready to begin the next adsorption bed with the adsorbent substantially free of the adsorbed (or contaminant) component. As shown in FIG. 4*b*), as the adsorption cycle progresses, the adsorbent at the inlet end can have a high concentration of the adsorbed component wherein the adsorbent in the darkened portion is substantially spent (i.e., the remaining adsorption capacity in this area of the adsorption bed can be substantially close to zero). As the as the adsorption cycle progresses, as shown in FIG. 4*c*), more of the adsorption bed can become spent as the adsorption front moves through the bed. However, in the prior art, these processes can typically be stopped at a phase in the adsorption process illustrated in FIG. 4*d*). Additionally, although the front, for illustrative purposes, can be drawn as a sharp plane, the front in actuality can typically be somewhat dispersed and non-linear due to irregularities in the process and equipment. As such, in order to maintain proper contaminant specifications in the product retrieved from the adsorbent bed, the adsorption front can be controlled so as not to breakthrough the end of the adsorbent bed, and the adsorption cycle of the process can be stopped and the bed can be regenerated.

However, as can be seen illustrated in FIG. 4*d*), the adsorption cycle can be stopped after the adsorption front has reached through only about 75% to about 85% of the adsorption bed. That is, the adsorption bed can typically be utilized only to about 75% to about 85% of its full adsorption capacity. The remaining ~15% to ~25% can be used, e.g., as a safety buffer (at less than full adsorption capacity) to ensure that the resulting product from the adsorption cycle can remain within specifications for contaminant levels. This can result in a waste of about 15% to about 25% of the overall adsorbent capacity.

Figure 5:
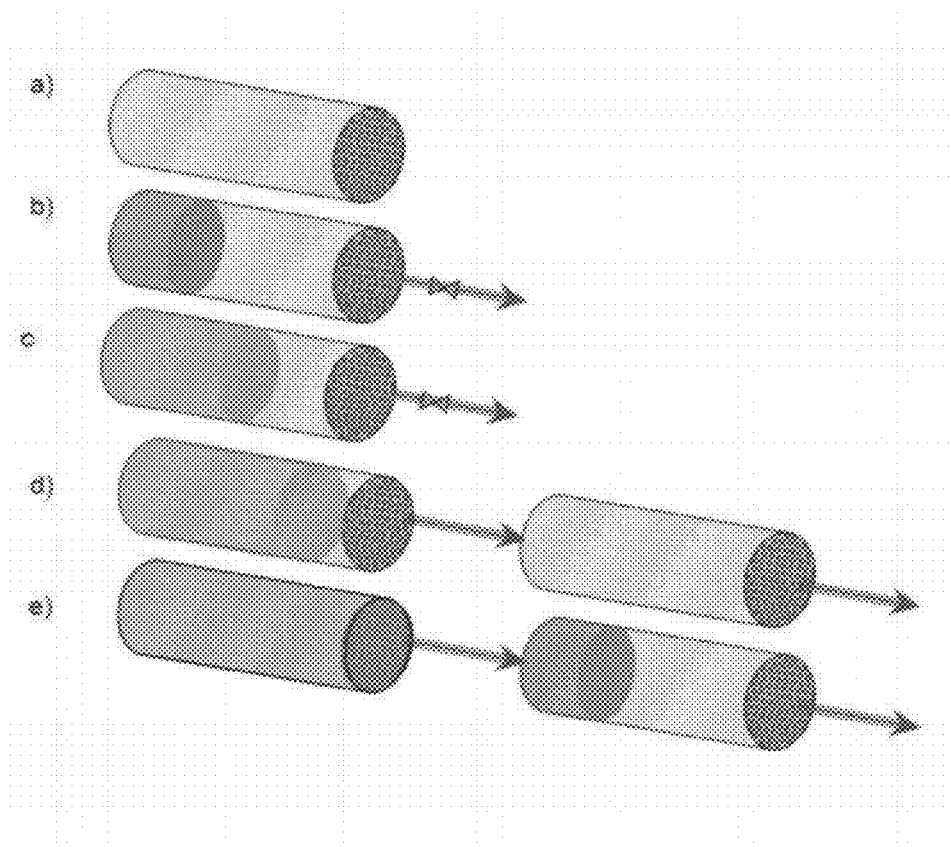
FIG. 5 hereof is a graphical representation of adsorption front management according to an embodiment of the present invention.

In contrast with the prior art, FIG. 5 illustrates an embodiment of the present invention. Here, the adsorption process can utilize at least two (2) separately operated adsorption beds (i.e., operated on separate cycles). This may not be a problem or additional burden, since essentially all commercial swing adsorption processes utilize at least two (2) beds since at least one (1) of the beds can be in an adsorption cycle while at least one (1) bed is in a desorption cycle. As illustrated in FIG. 5a), the desorbed adsorbent bed that has completed a cycle can be ready to begin the next adsorption bed with the adsorbent substantially free of the adsorbed (or contaminant) component. As shown in FIG. 5b), as the adsorption cycle progresses, the adsorbent at the inlet end can have a high concentration of the adsorbed component wherein the adsorbent in the darkened portion can be substantially spent. As the adsorption cycle progresses, as shown in FIG. 5c), more of the adsorption bed can become spent as the adsorption front moves through the bed. In the present invention, instead of ending the adsorption cycle in FIG. 5d), where the bed would be at about 75% to about 85% of its full adsorption capacity, the adsorption bed can be lined up to a second adsorption bed in the process, and the product stream can be taken off the end of the second adsorption bed instead of the first. It should be noted here that this second bed can be lined up at any time in the adsorption cycle of the first bed, but preferably prior to the point at which the adsorption front moves past the end of the first adsorption bed.

As can be further seen in FIG. 5e), the adsorption front can be controlled so as to move completely through the end of the first adsorption bed and into the second adsorption bed. At this point, the first adsorption bed can be utilized to near full capacity and then disconnected from the contaminated feed gas supply for regeneration. The contaminated feed gas supply can be switched directly to the inlet of the second adsorption bed, preferably either prior to or substantially simultaneously with the end of the first adsorbent bed's adsorption cycle. As can easily be seen from FIG. 5, in the present invention, the adsorbent beds can be used to essentially full capacity, thereby increasing the overall system capacity with no significant impacts to overall product quality.

The term "break-through" is defined herein as the point where the product gas leaving the adsorbent bed exceeds the target specification of the contaminant component. At the break through point, the adsorbent bed can be considered "spent", such that any significant further operation through the spent adsorption bed alone will result in off-specification product gas. As used herein, the "breakthrough" can generally coincide with the "adsorption front", i.e., at the time breakthrough is detected at the outlet of the adsorbent bed, the adsorption front is generally located at the end of the adsorption bed Please note that the "target specification" is any level of contaminant concentration that can be used for determining breakthrough and may be any level of contaminant concentration as set by the process control to ensure proper overall purity of the product stream from the swing adsorption process. As such the "target specification" can usually be some amount higher than the contaminant concentration of the overall resultant product stream retrieved from the process.

After the first adsorption bed is removed from the adsorption cycle, the adsorbed contaminant component can removed from the first adsorption bed by a reduction in pressure, an increase in temperature, or a combination thereof. In some embodiments, this portion can be accompanied by a reverse (counter-current) flow of gas to assist in desorbing the heavy component. As the pressure in the vessel is reduced, the contaminant component previously adsorbed in the bed can be progressively desorbed forming a contaminant product stream enriched in (i.e., has a higher mol % content of) the contaminant component as compared to the feed gas stream. When desorption is complete, the adsorbent bed can be purged with an inert gas stream, e.g., nitrogen and/or a purified stream of product gas. Purging can additionally or alternately be facilitated by the use of a higher temperature purge gas stream.

The total cycle time for the swing adsorption process represents the length of time from when the gaseous mixture is first conducted to the first adsorbent bed in a first cycle to the time when the gaseous mixture is first conducted to the first adsorbent bed in the immediately succeeding cycle, i.e., after a single regeneration of the first adsorbent bed. The use of third, fourth, fifth, etc., adsorbent beds in addition to the second adsorbent bed can serve to increase cycle time when adsorption time is short but desorption time is long.

Figure 1:
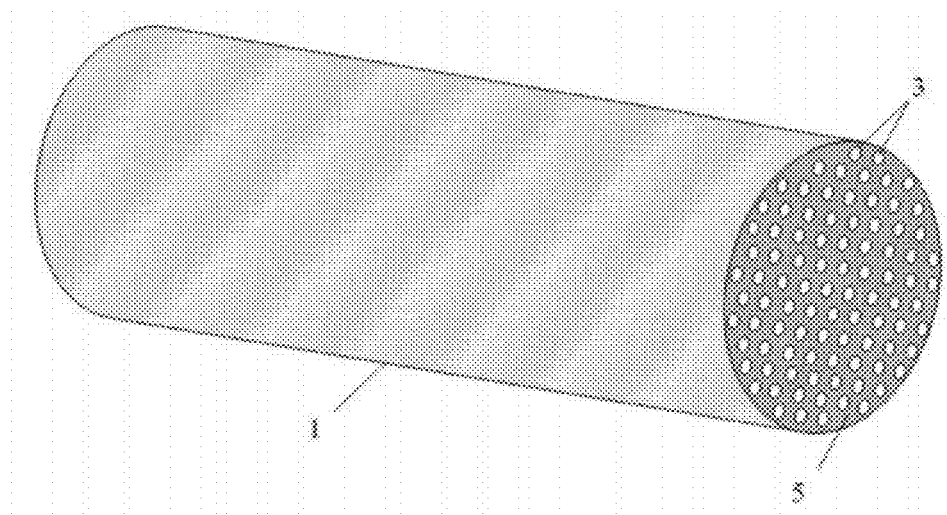
FIG. 1 hereof is a representation of one embodiment of a parallel channel contactor of the present invention in the form of a monolith directly formed from the microporous adsorbent of the present invention and containing a plurality of parallel channels.

In a preferred embodiment, the adsorbent can be incorporated into a parallel channel contactor. "Parallel channel contactors" are defined herein as a subset of adsorbent contactors comprising structured (engineered) contactors in which substantially parallel flow channels are incorporated into the structure. Parallel flow channels are described in detail in U.S. Patent Application Publication Nos. 2008/0282892 and 2008/0282886, both of which are incorporated herein by reference. These flow channels may be formed by a variety of means, and, in addition to the adsorbent material, the structure can contain other components such as support materials, heat sink materials and void reduction components. A wide variety of monolith shapes can be formed directly by extrusion processes. An example of a cylindrical monolith is shown schematically in FIG. 1 hereof. The cylindrical monolith 1 contains a plurality of parallel flow channels 3 that run the entire length of the monolith. These flow channels 3 can have diameters (channel gap) from about 5 microns to about 1000 microns, e.g., from about 50 to about 250 microns, as long as all channels of a given contactor have substantially the same size channel gap. The channels could have a variety of shapes including, but not limited to, round, square, triangular, hexagonal, and combinations thereof. The space between the channels can be occupied by the adsorbent 5. As shown in FIG. 1, the channels 3 can occupy about 25% of the volume of the monolith, and the adsorbent 5 can occupy about 75% of the volume of the monolith (e.g., from about 50% to about 98% of the volume). The effective thickness of the adsorbent can be defined from the volume fractions occupied by the adsorbent 5 and channel structure as:

$$\text{Effective Thickness Of Adsorbent} = \frac{1}{2}\text{Channel Diameter} \cdot \frac{\text{Volume Fraction Of Adsorbent}}{\text{Volume Fraction Of Channels}}$$

Figure 2:
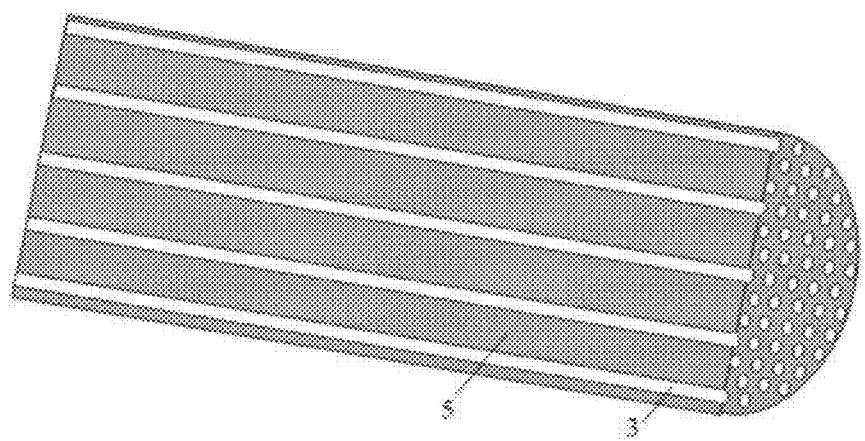
FIG. 2 hereof is a cross-sectional representation along the longitudinal axis of the monolith of FIG. 1.
Figure 3:
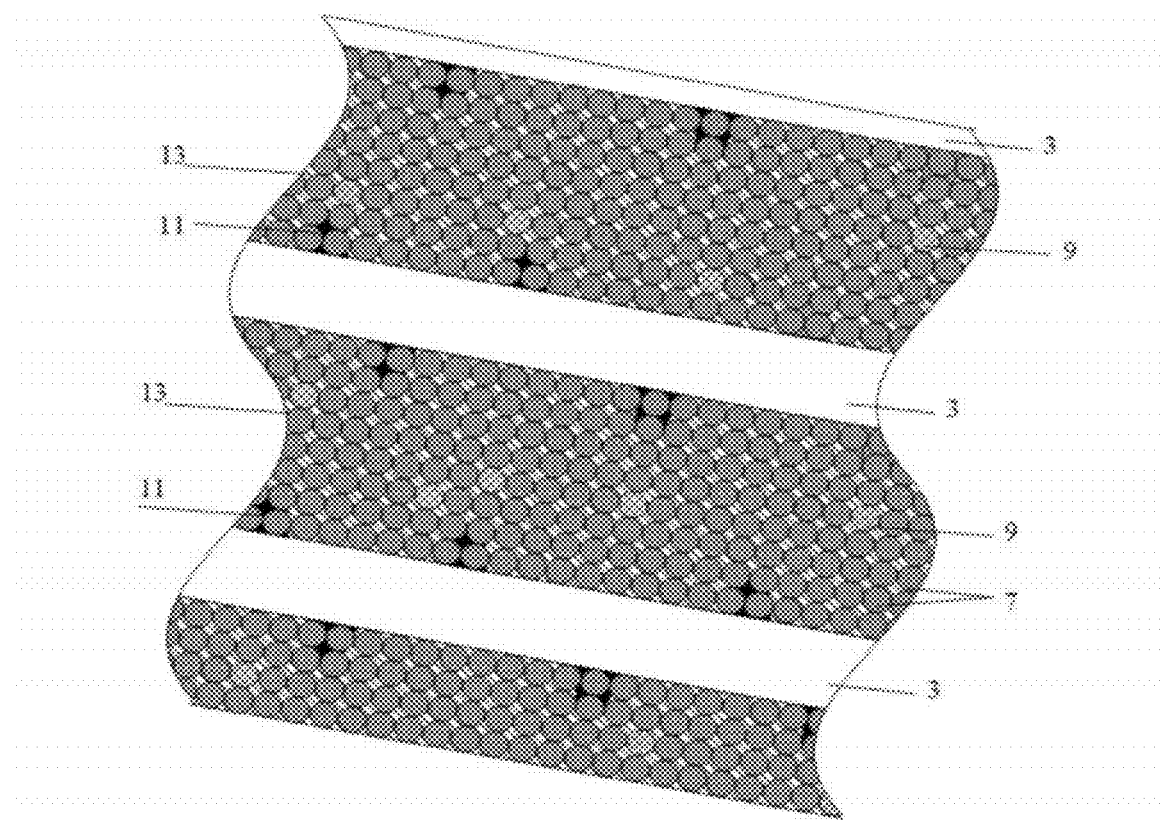
FIG. 3 hereof is a representation of a magnified section of the cross-sectional view of the monolith of FIG. 2 showing the detailed structure of the adsorbent layer along with a blocking agent occupying some of the mesopores and macropores.

FIG. 2 hereof is a cross-sectional view along the longitudinal axis showing feed channels 3 extending through the length of the monolith with the walls of the flow channels formed entirely from adsorbent 5 plus binder, mesopore filler, and heat sink material. A schematic diagram enlarging a small cross section of adsorbent layer 5 is shown in FIG. 3 hereof. The adsorbent layer 5 is comprised of microporous adsorbent or polymeric particles 7; solid particles (thermal mass) 9; that act as heat sinks, a blocking agent 13, and open mesopores and macropores 11. As shown, the microporous adsorbent or polymeric particles 7 can occupy about 60% of the volume of the adsorbent layer, and the particles of thermal mass 9 can occupy about 5% of the volume. With this composition, the voidage (flow channels) can be about 55% of the volume occupied by the microporous adsorbent or polymeric particles. The volume of the microporous adsorbent 5 or polymeric particles 7 can range from about 25% of the volume of the adsorbent layer to about 98% of the volume of the adsorbent layer. In practice, the volume fraction of solid particles 9 used to absorb thermal energy and limit temperature rise can range from about 0% to about 75%, preferably from about 5% to about 75% or from about 10% to about 60%. A mesoporous non-adsorbing filler, or blocking agent, 13 can fill the desired amount of space or voids left between particles so that the volume fraction of open mesopores and macropores 11 in the adsorbent layer 5 can be less than about 30 vol %, e.g., less than about 20 vol % or less than 10 vol %.

When the monolith contactor is used in a gas separation process that relies on a kinetic separation (predominantly diffusion controlled), it can be advantageous for the microporous adsorbent/polymeric particles 7 to be substantially the same size. It can be preferred for the standard deviation of the volume of the individual microporous adsorbent/polymeric particles 7 to be less than 100% (e.g., less than 50%) of the average particle volume for kinetically controlled processes. The particle size distribution for zeolite adsorbents can be controlled by the method used to synthesize the particles. Additionally or alternatively, it can be possible to separate pre-synthesized microporous adsorbent particles by size using methods such as a gravitational settling column. Further additionally or alternatively, it can be advantageous to use uniformly sized microporous adsorbent/polymeric particles in equilibrium controlled separations.

In a preferred embodiment, the swing adsorption process can be rapidly cycled, in which case the processes are referred to as rapid cycle thermal swing adsorption (RCTSA), rapid cycle pressure swing adsorption (RCPSA), and rapid cycle partial pressure swing or displacement purge adsorption (RCPPSA). For RCPSA the total cycle times can be typically less than 90 seconds, preferably less than 60 seconds, e.g., less than 30 seconds, less than 15 seconds, less than 10 seconds. For RCTSA, the total cycle times can typically be less than 600 seconds, e.g., less than 200 seconds, less than 100 seconds, or less than 60 seconds. One key advantage of RCPSA technology can be a significantly more efficient use of the adsorbent material. The quantity of adsorbent required with RCPSA technology can be only a fraction of that required for conventional PSA technology to achieve the same separation quantities and qualities. As a result, the footprint, the investment, and/or the amount of active adsorbent required for RCPSA can typically be significantly lower than that for a conventional PSA unit processing an equivalent amount of gas. In applications where $CO_2$ is removed from natural gas in swing adsorption processes, it can be preferred to formulate the adsorbent with a specific class of 8-ring zeolite materials that has a kinetic selectivity, though equilibrium-based adsorption can be an alternative. The kinetic selectivity of this class of 8-ring zeolite materials can allow $CO_2$ to be rapidly transmitted into zeolite crystals while hindering the transport of methane, so that it is possible to selectively separate $CO_2$ from a mixture of $CO_2$ and methane. For the removal of $CO_2$ from natural gas, this specific class of 8-ring zeolite materials can have an Si/Al ratio greater than about 250, e.g., greater than about 500, greater than about 1000, from 2 to about 1000, from about 10 to about 500, or from about 50 to about 300. As used herein, the Si/Al ratio is defined as the molar ratio of silica to alumina of the zeolitic structure. This class of 8-ring zeolites can allow $CO_2$ to access the internal pore structure through 8-ring windows in a manner such that the ratio of single component diffusion coefficients for $CO_2$ over methane (i.e., $D_{CO2}/D_{CH4}$) can be greater than 10, preferably greater than about 50, greater than about 100, or greater than about 200.

Additionally or alternately, in many instances, nitrogen may desirably be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas, like with $CO_2$, it can be preferred to formulate the adsorbent with a class of 8-ring zeolite materials that has a kinetic selectivity. The kinetic selectivity of this class of 8-ring materials can allow $N_2$ to be rapidly transmitted into zeolite crystals while hindering the transport of methane, so that it is possible to selectively separate $N_2$ from a mixture of $N_2$ and methane. For the removal of $N_2$ from natural gas, this specific class of 8-ring zeolite materials can have an Si/Al ratio from about 2 to about 1000, e.g., from about 10 to about 500 or from about 50 to about 300. This class of 8-ring zeolites can allow $N_2$ to access the internal pore structure through 8-ring windows in a manner such that the ratio of single component diffusion coefficients for $N_2$ over methane (i.e., $D_{N2}/D_{CH4}$) can be greater than 5, preferably greater than about 20, greater than about 50, or greater than 100. Resistance to fouling in swing adsorption processes during the removal of $N_2$ from natural gas can be one advantage offered by this class of 8-ring zeolite materials.

Additionally or alternatively from $CO_2$, it can be desirable to remove $H_2S$ from natural gas which can contain from about 0.001 vol % $H_2S$ to about 70 vol % $H_2S$ (e.g., from about 0.001 vol % to about 30 vol %, from about 0.001 vol % to about 10 vol %, from about 0.001 vol % to about 5 vol %, from about 0.001 vol % to about 1 vol %, from about 0.001 vol % to about 0.5 vol %, or from about 0.001 vol % to about 0.1 vol %). In this case, it can be advantageous to formulate the adsorbent with stannosilicates, as well as the aforementioned class of 8-ring zeolites that can have kinetic selectivity. The kinetic selectivity of this class of 8-ring materials can allow $H_2S$ to be rapidly transmitted into zeolite crystals while hindering the transport of methane, so that it is possible to selectively separate $H_2S$ from a mixture of $H_2S$ and methane. For the removal of $H_2S$ from natural gas, this specific class of 8-ring zeolite materials can have a Si/Al ratio from about 2 to about 1000, e.g., from about 10 to about 500 or from about 50 to about 300. This class of 8-ring zeolites can allow $H_2S$ to access the internal pore structure through 8-ring windows in a manner such that the ratio of single component diffusion coefficients for $H_2S$ over methane (i.e., $D_{H2S}/D_{CH4}$) can be greater than 5, preferably greater than about 20, greater than about 50, or greater than 100. DDR, Sigma-1, and/or ZSM-58 are examples of suitable materials for the removal of $H_2S$ from natural gas. In some applications, it can be desired for $H_2S$ to be removed to the ppm or ppb levels. To achieve such extensive removal of $H_2S$ it can be advantageous to use a PPSA or RCPPSA process.

Other non-limiting examples of selective adsorbent materials for use in embodiments herein can include microporous materials such as zeolites, AlPOs, SAPOs, MOFs (metal organic frameworks), ZIFs (zeolitic imidazolate frameworks, such as ZIF-7, ZIF-8, ZIF-22, etc.), and carbons, as well as mesoporous materials such as amine functionalized MCM materials, and the like, and combinations and reaction products thereof. For acidic gases such as hydrogen sulfide and carbon dioxide typically found in natural gas streams, adsorbents such as cationic zeolites, amine-functionalized mesoporous materials, stannosilicates, carbons, and combinations thereof can be preferred, in certain embodiments.

It can sometimes be necessary to remove heavy (e.g., $C_{2+}$ or $C_{3+}$) hydrocarbons, e.g., from natural gas or gas associated with the production of oil. Heavy hydrocarbon removal may be necessary for dew point conditioning before the natural gas is shipped via pipeline or to condition natural gas before it is liquefied. Additionally or alternately, it may be advantageous to recover heavy hydrocarbons from produced gas in enhanced oil recovery (EOR) floods that employ $CO_2$ and optimum for the process. In certain fuel applications, a water-gas shift reaction may be employed to shift the syngas almost entirely to $H_2$ and $CO_2$, and in many such applications it can be desirable to remove the $CO_2$.

Figure 6:
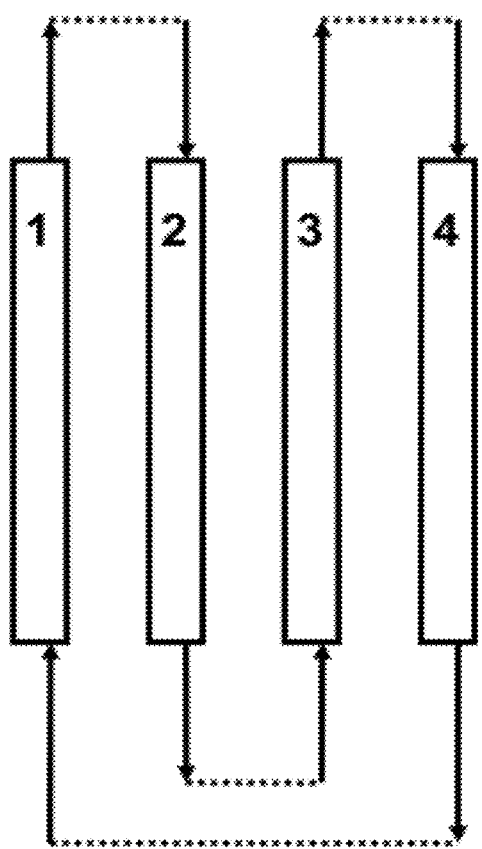
FIG. 6 hereof is a representation of four adsorbent beds fluidly connected in series.

The following is a logic table of the steps in a complete cycle for an embodiment of a four adsorbent bed configuration utilizing the process of the present invention, and as illustrated in FIG. 6 hereof.

| Bed | Time |     |     |     |     |     |     |     |     |     |     |     |     |     |     |     |     |     |     |
|-----|------|-----|-----|-----|-----|-----|-----|-----|-----|-----|-----|-----|-----|-----|-----|-----|-----|-----|-----|
| 1   | FA   | FA  | FA  | FA  | FA  | BD  | BD  | BD  | BD  | RG  | RG  | RP  | RP  | RP  | RP  | FB  | FB  | FB  | FB  | FB  |
| 2   | FB   | FB  | FB  | FB  | FB  | FA  | FA  | FA  | FA  | FA  | BD  | BD  | BD  | BD  | RG  | RG  | RP  | RP  | RP  | RP  |
| 3   | RG   | RP  | RP  | RP  | RP  | FB  | FB  | FB  | FB  | FB  | FA  | FA  | FA  | FA  | FA  | BD  | BD  | BD  | BD  | RG  |
| 4   | BD   | BD  | BD  | BD  | RG  | RG  | RP  | RP  | RP  | RP  | FB  | FB  | FB  | FB  | FB  | FA  | FA  | FA  | FA  | FA  | nitrogen. Further additionally or alternately, it may be advantageous to recover heavy hydrocarbons from associated gas that is cycled back into an oil reservoir during some types of oil production. In many instances where it is desirable to recover heavy hydrocarbons, the gas can be at pressures in of at least 1,000 psig, e.g., of at least 5,000 psig or at least 7,000 psig. It can be advantageous in certain of these applications to use an adsorbent formulated with a zeolite having a pore size between about 5 angstroms and about 20 angstroms. Non-limiting examples of zeolites having pores in this size range can include MFI, faujasite, MCM-41, Beta, and the like, and combinations and intergrowths thereof. It can be preferred in some embodiments that the Si/Al ratio of zeolites utilized for heavy hydrocarbon removal to be from 1 to 1000.

In equilibrium controlled swing adsorption processes, most of the selectivity can be imparted by the equilibrium adsorption properties of the adsorbent, and the competitive adsorption isotherm of the light product in the micropores or free volume of the adsorbent may be disfavored. In kinetically controlled swing adsorption processes, most of the selectivity can be imparted by the diffusional properties of the adsorbent and the transport diffusion coefficient in the micropores and free volume of the adsorbent of the light species can be less than that of the heavier species. Additionally or alternately, in kinetically controlled swing adsorption processes with microporous adsorbents, the diffusional selectivity can arise from diffusion differences in the micropores of the adsorbent and/or from a selective diffusional surface resistance in the crystals or particles that make-up the adsorbent.

The present invention can additionally or alternately be applied to improve the separation of molecular species from synthesis gas. Synthesis gas can be produced by a wide variety of methods, including steam reforming of hydrocarbons, thermal and catalytic partial oxidation of hydrocarbons, and many other processes and combinations known in the art. Synthesis gas is used in a large number of fuel and chemical applications, as well as power applications such as Integrated Gasification Combined Cycle (IGCC). All of these applications have a specification of the exact composition of the syngas required for the process. As produced, synthesis gas can contain at least CO and $H_2$. Other molecular components in the gas can be $CH_4$, $CO_2$, $H_2S$, $H_2O$, $N_2$, and combinations thereof. Minority (or trace) components in the gas can include hydrocarbons, $NH_3$, $NO_x$, and the like, and combinations thereof. In almost all applications, most of the $H_2S$ should typically be removed from the syngas before it can be used, and, in many applications, it can be desirable to remove much of the $CO_2$. In applications where the syngas is used as a feedstock for a chemical synthesis process, it can generally be desirable to adjust the $H_2$/CO ratio to a value that can be In the above table, FA is the primary feed/adsorption step; BD is the blow-down/depressurization step; RG is the adsorbent regeneration step; RP is the adsorbent bed repressurization step; and FB is the secondary feed/adsorption step. Following the above sequence with respect to the four adsorbent beds shown in FIG. 6 hereof, once a first cycle is completed in all four adsorbent beds, the adsorption front can be allowed to break through the adsorbent bed undergoing an adsorption step, can be passed to the next downstream adsorbent bed that has just undergone regeneration and repressurization, and can then perform an adsorption step on the product stream from the next previous adsorbent bed. This can mitigate the amount of product trapped at the end of the adsorbent bed by allowing the entire product stream coming out of an adsorbent bed to flow into a next bed to continue adsorption. In certain embodiments, the number of adsorbent beds required for the practice of the present invention can be equal to the number of discrete steps in a cycle.

Once the adsorption front has moved into the next downstream adsorbent bed, the pressure in the adsorbent bed can then be reduced, preferably in a series of blow-down steps in a co-current or counter-current and can be performed with or without a purge gas stream to the final target gas recovery pressure. Pressure reduction can preferably occur in less than 8 steps, e.g., in less than 4 steps, with target species being recovered in each step. In one preferred embodiment, the pressure can be decreased by a factor of approximately three in each step. Additionally or alternately, the depressurization can be conducted counter-currently and/or, during the depressurizing step, a purge gas can be passed counter-current (from product end to feed end) through the adsorbent bed. Further additionally or alternately, the purge gas can be a so-called "clean gas". By "clean gas" is meant a gas that is substantially free of target gas components. For example, if the target gas is an acid gas, then the clean gas can be a stream substantially free of acid gases such as $H_2S$ and $CO_2$ (e.g., containing less than 5 mol % of combined $H_2S$ and $CO_2$, or less than 1 mol %). An example of a preferred clean gas could be the product gas itself When the current invention is utilized for the removal of acid gas from a natural gas stream, the "clean gas" can be comprised of at least one of the hydrocarbon product streams, e.g., of $C_{3-}$ hydrocarbons or of methane. Alternately, a separate "clean gas" can be used, e.g., comprised of nitrogen.

Regeneration of the adsorbent bed can occur during this depressurization step. During regeneration, the strongly adsorbed (contaminant) component or components can be desorbed from the contactor. After an adsorbent bed is depressurized and regenerated by removal of the contaminant gas components, it can preferably be repressurized prior to the beginning of the next adsorption cycle. Additionally or alternately, it can generally be preferable to cool the bed before repressurization.

Regeneration of the bed can additionally or alternately be accomplished through the use of a temperature swing process, or a combination of a temperature swing and pressure swing processes. In the temperature swing process, the temperature of the adsorbent bed can be raised to a point wherein the contaminant gas component(s) can be desorbed from the bed. Purge gases, as described herein, can be utilized during and/or in conjunction with temperature-driven desorption. With the temperature swing desorption, it can additionally or alternately be preferred for the adsorbent bed to be cooled prior to desorption and prior to beginning the next adsorption cycle.

In a preferred embodiment of the present invention, the contactor is combined with an adsorbent into a heat exchange structure in a manner that can produce a thermal wave. In Thermal Wave Adsorption (TWA), adsorbent can be placed in one set of heat exchanger channels, while the other set of channels can be used to bring heat into and/or take heat out of the adsorbent device. Fluids and/or gases flowing in the adsorbent and heating/cooling channels do not generally contact each other. In certain embodiments, the heat adding/removing channels can be designed and operated in a manner that results in a relatively sharp temperature wave in the adsorbent and/or in the heating and cooling fluids during the heating and cooling steps in the cycle.

Thermal waves in such contactors can be produced in when the heating and cooling fluids are flowed co-current or counter-current to the direction of the feed flow in the adsorption step. In many cases, it can be preferred not to have a significant flow of heating or cooling fluids during the adsorption step. A more comprehensive description of Thermal Wave Adsorption (TWA) and other appropriate contactor structures can be found, e.g., in U.S. Pat. No. 7,938,886, which is incorporated herein by reference. This reference shows how to design and operate a contactor to control the sharpness and nature of a thermal wave. A key operational parameter can include the fluid velocity in the contactor. Key design parameters can include the mass of the contactor and heat capacity and thermal conductivity of materials used to form the contactor and heat transfer fluid. An additional key design objective for the contactor can be finding one or more ways to reduce/minimize the distance over which heat has to be transferred, which is why relatively sharp thermal waves can be so desirable.

In some embodiments, during the heating step, the volume of fluid at a temperature no more than 10° C. warmer than the end of the contactor from which it is produced can represent at least 25% (e.g., at least 50% or at least 75%) of the volume of the fluid introduced into the contactor for heating. Similarly, when the present invention is operated to attain a thermal wave, it can be preferred that, during the cooling step, a cold fluid (such as pressurized water) can be flowed into the contactor and a hot fluid near the temperature of the contactor at the end of the recovery step can flow out of the contactor. Most of the recovery step can generally occur after the contactor has been heated. Thus additionally or alternately, during the cooling step, the volume of fluid at a temperature no more than 10° C. colder than the end of the contactor from which it is produced can represent at least 25% (e.g., at least 50% or at least 75%) of the volume of the fluid introduced into the contactor for cooling.

One way to efficiently utilize thermal waves in the apparatuses according to the invention can be for heat recovery. The recovered energy can be used to reduce the energy requirements for heating and cooling of the contactor, for a different contactor of a multitude of contactors needed for a continuous process, and/or for any other purpose. More specifically, energy contained in the hot stream exiting the contactor during the cooling step can be utilized to reduce the energy that must be supplied during the heating step. Similarly, the cold stream exiting the contactor during the heating step can be utilized to reduce the energy that must be supplied to cool fluid to be supplied to the contactor during the cooling step. There are many ways to recoup the energy. For example, the hot thermal fluid flowing out of one contactor can be sent to another with trim heating in between, and/or the cold fluid flowing out of one contactor can be sent to another with trim cooling in between. The thermal fluid flow path between contactors can be determined by valves timed to route thermal fluid between contactors at appropriate points in the overall swing adsorption cycle. In embodiments where thermal fluid flows between contactors, it may also pass through a heat exchanger that adds or removes heat from the flowing thermal fluid and/or pass through a device, such as a compressor, pump, and/or blower, that pressurizes it so it can flow at the desired rate though the contactors. A heat storage medium can be configured so that the energy from the thermal wave moving through one contactor can be stored. A non-limiting example is a tank system that separately stores hot and cold fluids, which can each be fed back into the contactor that produced it and/or to another contactor. In many embodiments, the flow of the thermal fluid through the contactor can be arranged to minimize the mixing of the fluid in the direction of the general flow of the fluid through the contactor and to minimize the effect of the thermal conductivity of the fluid on the sharpness of the temperature wave.

Where energy is recovered, it can be preferred that the recovered energy be used to reduce the amount of sensible heat that must be supplied to heat and cool the contactor. The sensible heat is determined by the heat capacity and temperature rise (or fall) of the contactor. In some embodiments, at least 60% (e.g., at least 80% or at least 95%) of the sensible heat required for heating the contactor is recouped, and/or at least 60% (e.g., at least 80% or at least 95%) of the sensible heat needed to cool the contactor is recouped.

Relatively sharp thermal waves, as used herein, can be expressed in terms of a standard temperature differential over a distance relative to the length of the mass/heat transfer flow in the apparatus. With respect to the mass/heat transfer, we can define a maximum temperature, $T_{max}$, and a minimum temperature, $T_{min}$, as well as convenient temperatures about 10% above $T_{min}$ ($T_{10}$) and about 10% below $T_{max}$ ($T_{90}$). Thermal waves can be said to be relatively sharp when at least the temperature differential of ($T_{90}-T_{10}$) occurs over at most 50% (e.g., at most 40%, at most 30%, or at most 25%) of the length of the apparatus that participates in the mass/thermal transfer. Additionally or alternately, relative sharp thermal waves can be expressed in terms of a maximum Peclet number, Pe, defined to compare axial velocity of the heating/cooling fluid to diffusive thermal transport roughly perpendicular to the direction of fluid flow. Pe can be defined as $(U*L)/\alpha$, where U represents the velocity of the heating/cooling fluid (in m/s), L represents a characteristic distance over which heat is transported (to warm/cool the adsorbent) in a direction roughly perpendicular to the fluid flow, and $\alpha$ represents the effective thermal diffusivity of the contactor (in $m^2/s$) over the distance L. In addition or alternately to the thermal differential over length, thermal waves can be said to be relatively sharp when Pe is less than 10, for example less than 1 or less than 0.1. To minimize time for heating/cooling of the contactor with little or no damage to the flow channel, it can be preferred for U to be in a range from about 0.01 m/s to about 100 m/s, e.g., from about 0.1 m/s to about 50 m/s or from about 1 m/s to about 40 m/s. Additionally or alternately, to minimize size and energy requirements, it can be preferred for L to be less than 0.1 meter, e.g., less than 0.01 meter or less than 0.001 meter.

In certain embodiments, the adsorbent bed can cooled, preferably to a temperature equal to or less than about 40° C. above the temperature of feed gas mixture, e.g., less than 20° C. above or less than 10° C. above. Additionally or alternately, the adsorbent bed can be cooled by external cooling that can be done in a co-current or counter-current manner, such that a thermal wave can pass through the bed. Further additionally or alternately, only the first part of the adsorbent bed can be cooled then repressurized. It is within the scope of this invention that the adsorbent bed be purged with a clean gas during this cooling step. The adsorbent bed is then repressurized either during or after the cooling step. The adsorbent bed can be repressurized by use of clean gas, e.g., a clean product gas, and/or counter-currently with blow-down gas from another bed after a first stage of repressurization. The final pressure of the repressurization step can preferably be substantially equal to the pressure of the incoming feed gas mixture.

Adsorptive kinetic separation processes, apparatuses, and systems, as described above, are useful for development and production of hydrocarbons, such as gas and oil processing. Particularly, the provided processes, apparatuses, and systems can be useful for the rapid, large scale, efficient separation of a variety of target gases from gas mixtures.

The provided processes, apparatuses, and systems may be used to prepare natural gas products by removing contaminants. The provided processes, apparatuses, and systems can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes, apparatuses, and systems may be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes, apparatuses, and systems provided herein, to prepare a desirable product stream, while maintaining relatively high hydrocarbon recovery:

(a) using one or more kinetic swing adsorption processes, such as pressure swing adsorption (PSA), thermal swing adsorption (TSA), and partial pressure swing or displacement purge adsorption (PPSA), including combinations of these processes; each swing adsorption process may be utilized with rapid cycles, such as using one or more rapid cycle pressure swing adsorption (RC-PDS) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884, which are each herein incorporated by reference in its entirety;

(b) removing acid gas with RC-TSA using advanced cycles and purges as described in U.S. Provisional Application No. 61/447,858, filed Mar. 1, 2011, as well as the U.S. Patent Application bearing docket number 2011EM060-US2, claiming priority thereto, which are together incorporated by reference herein in their entirety;

(c) using a mesopore filler to reduce the amount of trapped methane in the adsorbent and increase the overall hydrocarbon recovery, as described in U.S. Patent Application Publication Nos. 2008/0282892, 2008/0282885, and 2008/028286, each of which is herein incorporated by reference in its entirety;

(d) choosing an appropriate adsorbent materials to provide high selectivity and reduce/minimize adsorption (and losses) of methane and other hydrocarbons, such as one or more of the zeolites described in U.S. Patent Application Publication Nos. 2008/0282887 and 2009/0211441, each of which is herein incorporated by reference in its entirety;

(e) depressurizing one or more RC-TSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(f) using exhaust or recycle streams to minimize processing and hydrocarbon losses, such as using exhaust streams from one or more RC-TSA units as fuel gas instead of re-injecting or venting;

(g) using multiple adsorbent materials in a single bed to remove trace amounts of first contaminants, such as $H_2S$, before removal of a second contaminant, such as $CO_2$; such segmented beds may provide rigorous acid gas removal down to ppm levels with RC-TSA units with minimal purge flow rates;

(h) using feed compression before one or more RC-TSA units to achieve a desired product purity;

(j) contemporaneous removal of non-acid gas contaminants such as mercaptans, COS, and BTEX; selection processes and materials to accomplish the same;

(k) using structured adsorbents for gas-solid contactors to minimize pressure drop compared to conventional packed beds;

(l) selecting a cycle time and cycle steps based on adsorbent material kinetics; and (m) using a process and apparatus that uses, among other equipment, two RC-TSA units in series, wherein the first RC-TSA unit cleans a feed stream down to a desired product purity and the second RC-TSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

Compared to conventional technology, the provided processes, apparatuses, and systems can require lower capital investment, lower operating cost, and/or less physical space, thereby enabling implementation offshore and in remote locations, such as arctic environments. The provided processes, apparatuses, and systems can provide the foregoing benefits, while providing high hydrocarbon recovery as compared to conventional technology.

Additionally or alternately, the invention can comprise one or more of the following embodiments.

Embodiment 1. A swing adsorption process for separating contaminant gas components from a feed gas mixture containing at least one contaminant gas component, which process comprises: a) conducting the feed gas mixture directly to a first adsorption bed in a swing adsorption process unit containing a plurality of adsorbent beds each having a fluid inlet end and fluid outlet end wherein the first adsorption bed has a first primary adsorption cycle defined by the period of time from the start of connecting the fluid input end of the first adsorption bed directly to said feed gas mixture to the end of connecting the fluid input end of the first adsorption bed directly to said feed gas mixture; b) retrieving a first product stream flow from the fluid outlet end of the first adsorption bed; c) fluidly connecting the fluid outlet end of the first adsorption bed with the fluid inlet end of a second adsorption bed in the swing adsorption process unit during a point in the first primary adsorption cycle so that at least a portion of the first product stream from the fluid outlet end of the first adsorption bed is passed to the fluid inlet end of the second adsorption bed at which time the second adsorption bed is in a first secondary adsorption cycle which first secondary adsorption cycle is defined by the period of time from the start of exposing the second adsorption bed to the first product stream from the fluid outlet end of the first adsorption bed to the end of exposing the second adsorption bed to the first product stream from the fluid outlet end of the first adsorption bed; d) retrieving a second product stream flow from the fluid outlet end of the second adsorption bed; e) fluidly disconnecting the fluid outlet end of the first adsorption bed from the fluid inlet end of a second adsorption bed; and f) conducting the feed gas mixture directly to the second adsorption bed wherein the second adsorption bed has a second primary adsorption cycle defined by the period of time from the start of connecting the fluid input end of the second adsorption bed directly to said feed gas mixture to the end of connecting the fluid input end of the second adsorption bed directly to said feed gas mixture, wherein the first product stream and the second product stream each have a lower mol % of the contaminant gas component than the feed gas mixture, and the beginnings and ends of the first primary adsorption cycle and the second primary adsorption cycle do not both coincide with each other.

Embodiment 2. The process of embodiment 1, wherein one or more of the following is satisfied: step f) starts simultaneously with or prior to the beginning of step e); step c) starts prior to breakthrough of the contaminant gas component from the first adsorption bed; and step e) starts prior to breakthrough of the contaminant gas component from the second adsorption bed.

Embodiment 3. The process of embodiment 1 or embodiment 2, wherein the adsorption front moves from the first adsorption bed to the second adsorption bed during the first secondary adsorption cycle or during an overlap of the first primary adsorption cycle and the first secondary adsorption cycle.

Embodiment 4. The process of any one of the previous embodiments, wherein the contaminant gas component is selected from $CO_2$, $H_2S$, and combinations thereof, e.g., comprises $CO_2$, and/or wherein the feed gas mixture is comprised of methane.

Embodiment 5. The process of any one of the previous embodiments, wherein the first adsorbent bed and the second adsorbent bed are comprised of an B-ring zeolite, e.g., having a Si/Al ratio greater than about 500.

Embodiment 6. The process of any one of the previous embodiments, wherein feed gas mixture is comprised of methane and $CO_2$, wherein $CO_2$ is the contaminant gas component, and the zeolite has a diffusion coefficient for $CO_2$ over methane ($D_{CO2}/D_{CH4}$) greater than 10.

Embodiment 7. The process of any one of the previous embodiments, wherein feed gas mixture is comprised of methane and $N_2$, wherein $N_2$ is the contaminant gas component, and the zeolite has a diffusion coefficient for $N_2$ over methane ($D_{N2}/D_{CH4}$) greater than 10.

Embodiment 8. The process of any one of the previous embodiments, wherein feed gas mixture is comprised of methane and $H_2S$, wherein $H_2S$ is the contaminant gas component, and the zeolite has a diffusion coefficient for $H_2S$ over methane ($D_{H2S}/D_{CH4}$) greater than 10.

Embodiment 9. The process of any one of the previous embodiments, wherein the first adsorbent bed and the second adsorbent bed are comprised of a zeolite selected from DDR, Sigma-1, ZSM-58, and combinations and intergrowths thereof.

Embodiment 10. The process of any one of the previous embodiments, wherein the first adsorbent bed and the second adsorbent bed are comprised of a microporous material selected from zeolites, AlPOs, SAPOs, MOFs (metal organic frameworks), ZIFs, carbon, and combinations and intergrowths thereof.

Embodiment 11. The process of any one of the previous embodiments, wherein the first adsorbent bed and the second adsorbent bed are comprised of a material selected from cationic zeolites, amine-functionalized mesoporous materials, stannosilicates, carbon, and combinations thereof.

Embodiment 12. The process of any one of the previous embodiments, wherein the first adsorbent bed and the second adsorbent bed are comprised of a zeolite selected from MFI, faujasite, MCM-41, Beta, and combinations and intergrowths thereof.

Embodiment 13. The process of any one of the previous embodiments, wherein the process is a rapid cycle pressure swing adsorption process wherein a total cycle time is less than 200 seconds, e.g., less than 30 seconds.

Embodiment 14. The process of any one of the previous embodiments, wherein one or more of the following is satisfied: the feed gas mixture is conducted to the first adsorption bed at a pressure greater than 1,000 psig; the first adsorbent bed is cooled to a temperature no more than about 40° C. above the temperature of feed gas mixture prior to step a); and at least one adsorbent bed in the swing adsorption process is a parallel channel contactor.

EXAMPLES

Example 1

This Example demonstrates that there a stable solution can be formed when the adsorption front is rolled from one bed into another and that it is possible to achieve excellent performance in a swing adsorption process. A detailed model was constructed using gPROMS differential equation solving software of a PSA cycle in which the adsorption front was rolled from one bed into another. The model includes all of the important mass transport effects known to those skilled in the art, such as competitive adsorption, kinetics of molecular transport into the adsorbent, thermal effects due to the heat of adsorption, and thermodynamics (non-ideality and fugacity) of the gas mixture throughout the contactor, for example. The model also accounted for the important hydrodynamic effects known to those skilled in the art such as gas velocity in the contactors, pressure drop through the contactors, and pressure drops across valves, inter alia. The model was configured to describe parallel channel contactors in the form of monoliths housed in pressure vessels with poppet valves to control flow of gases in a 12-step PSA process. Open gas channels in the monolith were square passages ~200 micron high and ~200 microns wide. A ~100 micron thick adsorbent layer containing ~60 vol % relatively uniform-sized DDR zeolite crystals lined the gas passages and a ~100 micron thick web surrounded the adsorbent layer. With this structure, the distance between centers of adjacent gas passages was ~500 microns. Each monolith modeled was ~0.915 meters long and ~1 meter in diameter. A portion of the mesopores (~99%) in the adsorbent layer was filled with a mesopore filler (see, e.g., U.S. Pat. No. 7,959,720, which is incorporated herein by reference). The size of the DDR crystals was chosen so the LDF (linear driving force) time constant for $CO_2$ diffusion into the crystals was ~10 sec$^{-1}$ at the ~55° C. temperature of the feed. The fresh feed stream entered the process with a pressure of ~55 bara and had a molar composition of ~30% $CO_2$ and ~70% $CH_4$.

Figure 7:
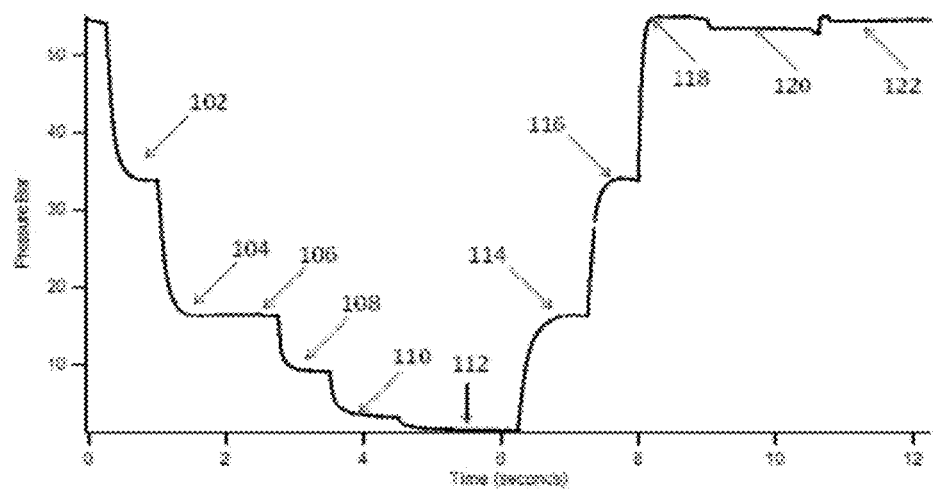
FIG. 7 hereof is a graphical representation of a pressure profile from an adsorption process according to an embodiment of the present invention.

FIG. 7 shows the pressure profile of one of 14 monoliths (beds) interconnected with valving to form a skid using. All monoliths on the skid were modeled to have a similarly shaped pressure profile that may be offset in time. The PSA cycle shown was designed with bed to bed equalizations. Gases withdrawn from the monolith adsorbent bed during the depressurization step were used to re-pressurize another bed on the skid. After the adsorption step has been completed and the adsorption front has been rolled into another bed and the $CO_2$ adsorption front has moved entirely through the monolith, the monolith was modeled to undergo a first depressurization/equalization step [102] (referred to as EQ #1). In this step, a valve on the housing for the monolith opened and connected the bed to another bed being repressurized. Gas flowed from the bed being depressurized to the bed being repressurized, and the valve was held open long enough so that the pressures between the two beds could equalize. After equalization the bed underwent a second depressurization/equalization step [104] (referred to as EQ #2). In this step, another valve on the housing for the monolith opened and connected the bed to a bed beginning to be repressurized. Gas flowed from the bed being depressurized to the bed being repressurized, and the valve was held open long enough so that the pressures between the two beds could equalize. After the beds equalized, the valve closed and the bed underwent a purge step [106].

Figure 8:
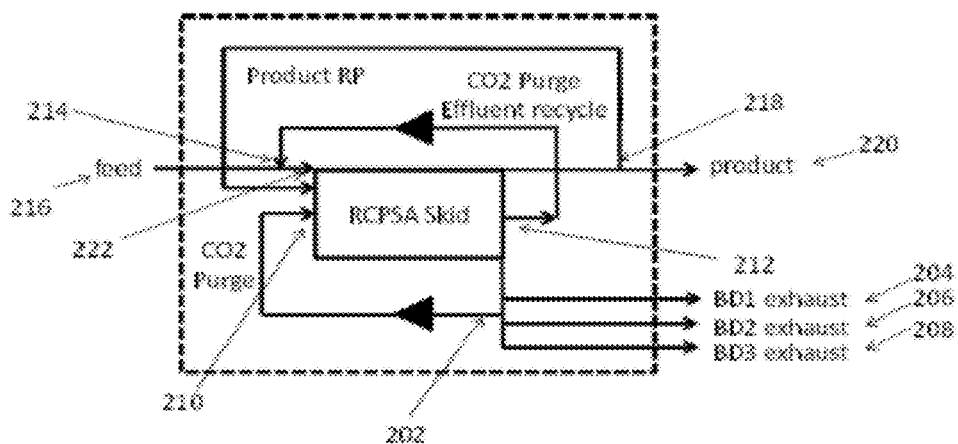
FIG. 8 hereof is a schematic representation of an adsorption process setup according to an embodiment of the invention.

As shown in FIG. 8, in this step, a $CO_2$-rich stream that has been collected [202] from the exhaust [204, 206, 208] of later blowdown $CO_2$ recovery steps was used to purge methane out of the bed. The purge stream [210] fed into the bed is referred to as the $CO_2$ Purge Inlet, and the purge stream coming out of the bed [212] is referred to as the $CO_2$ Purge Outlet. The $CO_2$ Purge Outlet was compressed and blended [214] with the incoming feed stream [216]. After the methane was purged from the bed, the bed was depressurized in a series of three blowdown recovery steps [108, 110, 112]. Gas collected was used to form streams 204, 206, 208 (referred to as BD1 exhaust, BD2 exhaust, and BD3 exhaust, respectively). At the end of blowdown #3, the bed was depressured to 1.4 bara. At this point, the bed was valved to begin a repressurization step [114] (referred to as R #2). In this step, the bed was connected to another bed undergoing step EQ #2. Gas coming from the EQ #2 step in the other bed was used to increase the bed pressure in step R #2. Once the beds have equalized, the bed was valved to begin another repressurization step [116] (referred to as R #1). In this step, the bed was connected to another bed undergoing step EQ #1. Gas coming from the EQ #1 step in the other bed was used to increase the bed pressure in step R #1. Once the beds equalized, the bed was valved to begin a final repressurization step [118] (referred to as Product RP). In this step, a slip stream [218] from the purified product
was used to repressurize the bed.

Once the product repressurization was completed, the bed began accepting the effluent from the adsorption step occurring in another bed to produce product [220]. In this step, the $CO_2$ adsorption front from another bed passed into the bed. The model showed that the adsorption front remained relatively sharp as it is rolled through the beds. After the adsorption front rolled into the bed, the bed was valved [122] to accept feed blended with the $CO_2$ purge effluent recycle [222]. During this step [122], the bed was connected to another bed initiating the adsorption process. In this step [122], the $CO_2$ adsorption front rolled through the bed and into the bed in the initial phase of the adsorption process. The model showed that, as the $CO_2$ adsorption front moved through the bed, it remained relatively sharp.

The model (which assumed a kinetic selectivity of about 500) indicated that a 14-bed skid was theoretically capable of processing ~81.8 million SCFD and of recovering ~94% the methane fed, while producing a product methane purity of ~95 mol % in a process that did not require vacuum or a rerun PSA. Approximately 9% of the methane fed was internally recycled in the process. Detailed stream compositions, pressures, temperatures, and flow rates are summarized in the table below.

| Stream | Flowrate per Monolith (MSCFD) | Molar Flow CO2 (mol/cycle) | Molar Flow CH4 (mol/cycle) | Pressure (bar) | Temp (deg C.) | Mol % CO2 | Mol % CH4 | Flowrate For 14 Bed Skid (MSCFD) |
|---|---|---|---|---|---|---|---|---|
| Feed and Recycle | 6.4 | 369 | 782 | 55.0 | 55.0 | 32.1 | 67.9 | 89.9 |
| CO2 Purge Inlet | 0.78 | 120 | 19.5 | 15.7 | 55.0 | 86.0 | 14.0 | 10.9 |
| Product RP | 0.75 | 1.35 | 134 | 55.0 | 55.0 | 1.0 | 99.0 | 10.5 |
| Product | 5.1 | 37.9 | 871 | 53.0 | 22.7 | 4.2 | 95.8 | 71.0 |
| CO2 Purge Outlet | 0.58 | 56.8 | 46.5 | 14.7 | 23.9 | 55.0 | 45.0 | 8.06 |
| BD1 Blowdown | 0.58 | 88.1 | 16.0 | 9.12 | 22.0 | 84.7 | 15.3 | 8.13 |
| BD2 Blowdown | 1.1 | 171 | 18.5 | 3.25 | 22.0 | 90.2 | 9.8 | 14.8 |

-continued

| Stream | Flowrate per Monolith (MSCFD) | Molar Flow CO2 (mol/cycle) | Molar Flow CH4 (mol/cycle) | Pressure (bar) | Temp (deg C.) | Mol % CO2 | Mol % CH4 | Flowrate For 14 Bed Skid (MSCFD) |
|---|---|---|---|---|---|---|---|---|
| BD3 Blowdown | 0.96 | 140 | 31.6 | 1.4 | 22.0 | 81.6 | 18.4 | 13.4 |
| EQ #1 | 0.76 | 46.5 | 90.6 | 32.4 | 27.1 | 33.9 | 66.1 | 10.7 |
| EQ #2 | 0.75 | 60.7 | 74.0 | 15.7 | 26.4 | 45.1 | 54.9 | 10.5 |
| R #1 | 0.80 | 48.8 | 95.3 | 32.4 | 27.1 | 33.9 | 66.1 | 11.3 |
| R #2 | 0.84 | 68.5 | 81.9 | 15.7 | 26.4 | 45.5 | 54.5 | 11.8 |
| Product Gas | 4.3 | 36.6 | 737 | 53.0 | 22.7 | 04.7 | 95.3 | 60.4 |
| Fresh Feed Gas | 5.8 | 312 | 736 | 55.0 | 55.0 | 29.8 | 70.2 | 81.8 |
| Recycle | 0.58 | 56.8 | 46.5 | 55.0 | 23.9 | 55.0 | 45.0 | 8.06 |
| Exhaust | 1.8 | 279 | 46.5 | 9.12 | 22 | 85.7 | 14.3 | 25.4 |

What is claimed is:

1. A swing adsorption process for separating contaminant gas components from a feed gas mixture containing at least one contaminant gas component, which process comprises:
    a) conducting the feed gas mixture directly to a first adsorption bed in a swing adsorption process unit containing a plurality of adsorbent beds each having a fluid inlet end and fluid outlet end wherein the first adsorption bed has a first primary adsorption cycle defined by the period of time from the start of connecting the fluid input end of the first adsorption bed directly to said feed gas mixture to the end of connecting the fluid input end of the first adsorption bed directly to said feed gas mixture;
    b) retrieving a first product stream flow from the fluid outlet end of the first adsorption bed;
    c) fluidly connecting the fluid outlet end of the first adsorption bed with the fluid inlet end of a second adsorption bed in the swing adsorption process unit during a point in the first primary adsorption cycle so that at least a portion of the first product stream from the fluid outlet end of the first adsorption bed is passed to the fluid inlet end of the second adsorption bed at which time the second adsorption bed is in a first secondary adsorption cycle which first secondary adsorption cycle is defined by the period of time from the start of exposing the second adsorption bed to the first product stream from the fluid outlet end of the first adsorption bed to the end of exposing the second adsorption bed to the first product stream from the fluid outlet end of the first adsorption bed;
    d) retrieving a second product stream flow from the fluid outlet end of the second adsorption bed;
    e) fluidly disconnecting the fluid outlet end of the first adsorption bed from the fluid inlet end of the second adsorption bed; and
    f) conducting the feed gas mixture directly to the second adsorption bed wherein the second adsorption bed has a second primary adsorption cycle defined by the period of time from the start of connecting the fluid input end of the second adsorption bed directly to said feed gas mixture to the end of connecting the fluid input end of the second adsorption bed directly to said feed gas mixture, wherein step f) starts prior to the beginning of step e), and wherein the first product stream and the second product stream each have a lower mol % of the contaminant gas component than the feed gas mixture, and the beginnings and ends of the first primary adsorption cycle and the second primary adsorption cycle do not both coincide with each other.

2. The process of claim 1, wherein the adsorption front moves from the first adsorption bed to the second adsorption bed during the first secondary adsorption cycle.

3. The process of claim 1, wherein the adsorption front moves from the first adsorption bed to the second adsorption bed during an overlap of the first primary adsorption cycle and the first secondary adsorption cycle.

4. The process of claim 1, wherein step c) starts prior to breakthrough of the contaminant gas component from the first adsorption bed.

5. The process of claim 1, wherein step e) starts prior to breakthrough of the contaminant gas component from the second adsorption bed.

6. The process of claim 1, wherein the contaminant gas component is selected from $CO_2$, $H_2S$, and combinations thereof.

7. The process of claim 1, wherein the contaminant gas component is $CO_2$.

8. The process of claim 1, wherein the feed gas mixture is comprised of methane.

9. The process of claim 1, wherein the first adsorbent bed and the second adsorbent bed are comprised of an 8-ring zeolite.

10. The process of claim 9, wherein the zeolite has a Si/Al ratio greater than about 500.

11. The process of claim 1, wherein feed gas mixture is comprised of methane and $CO_2$, wherein $CO_2$ is the contaminant gas component, and the zeolite has a diffusion coefficient for $CO_2$ over methane ($D_{CO2}/D_{CH4}$) greater than 10.

12. The process of claim 1, wherein feed gas mixture is comprised of methane and $N_2$, wherein $N_2$ is the contaminant gas component, and the zeolite has a diffusion coefficient for $N_2$ over methane ($D_{N2}/D_{CH4}$) greater than 10.

13. The process of claim 1, wherein feed gas mixture is comprised of methane and $H_2S$, wherein $H_2S$ is the contaminant gas component, and the zeolite has a diffusion coefficient for $H_2S$ over methane ($D_{H2S}/D_{CH4}$) greater than 10.

14. The process of claim 13, wherein the first adsorbent bed and the second adsorbent bed are comprised of a zeolite selected from DDR, Sigma-1, ZSM-58, and combinations and intergrowths thereof.

15. The process of claim 1, wherein the first adsorbent bed and the second adsorbent bed are comprised of a microporous material selected from zeolites, AlPOs, SAPOs, MOFs (metal organic frameworks), ZIFs, carbon, and combinations and intergrowths thereof.

16. The process of claim 1, wherein the first adsorbent bed and the second adsorbent bed are comprised of a material selected from cationic zeolites, amine-functionalized mesoporous materials, stannosilicates, carbon, and combinations thereof.

17. The process of claim 1, wherein the process is a rapid cycle pressure swing adsorption process wherein a total cycle time is less than 30 seconds.

18. The process of claim 1, wherein the process is a rapid cycle temperature swing adsorption process wherein a total cycle time is less than 200 seconds.

19. The process of claim 1, wherein the feed gas mixture is conducted to the first adsorption bed at a pressure greater than 1,000 psig.

20. The process of claim 1, wherein the first adsorbent bed and the second adsorbent bed are comprised of a zeolite selected from MFI, faujasite, MCM-41, Beta, and combinations and intergrowths thereof.

21. The process of claim 1, wherein the first adsorbent bed is cooled to a temperature no more than about 40° C. above the temperature of feed gas mixture prior to step a).

22. The process of claim 1, wherein at least one adsorbent bed in the swing adsorption process is a parallel channel contactor.

23. The process of claim 4, wherein step e) starts prior to breakthrough of the contaminant gas component from the second adsorption bed.

* * * * *